(12) United States Patent
Dantas et al.

(10) Patent No.: US 8,783,638 B2
(45) Date of Patent: *Jul. 22, 2014

(54) APPARATUS FOR SUPPORTING A WHEEL OF A VEHICLE

(71) Applicant: Snap-On Tools of Canada, Ltd., Mississauga (CA)

(72) Inventors: Roy J. Dantas, Scarborough (CA); Alexandru P. Mustata, Mississauga (CA)

(73) Assignee: Snap-on Tools of Canada, Ltd., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,149

(22) Filed: Oct. 25, 2013

(65) Prior Publication Data

US 2014/0048356 A1    Feb. 20, 2014

Related U.S. Application Data

(63) Continuation of application No. 12/881,699, filed on Sep. 14, 2010, now Pat. No. 8,590,852.

(60) Provisional application No. 61/242,248, filed on Sep. 14, 2009.

(51) Int. Cl.
   *B65D 19/00*    (2006.01)

(52) U.S. Cl.
   USPC ............... 248/346.06; 33/203; 33/203.14; 187/216

(58) Field of Classification Search
   None
   See application file for complete search history.

(56) References Cited

U.S. PATENT DOCUMENTS

| | | | | | |
|---|---|---|---|---|---|
| 29,375 | A | * | 7/1860 | Hinman | 425/127 |
| 1,968,672 | A | * | 7/1934 | Duby | 254/88 |
| 2,045,108 | A | * | 6/1936 | Smith | 33/203.12 |
| 3,143,810 | A | * | 8/1964 | McClendon | 33/203.12 |
| 3,216,530 | A | * | 11/1965 | Hunter | 254/88 |
| 3,606,253 | A | * | 9/1971 | Wooten et al. | 254/88 |
| 3,875,672 | A | * | 4/1975 | Castoe | 33/203.12 |

(Continued)

FOREIGN PATENT DOCUMENTS

| WO | 2006073680 A1 | 7/2006 |
|---|---|---|
| WO | 2011029204 A1 | 3/2011 |

OTHER PUBLICATIONS

International Preliminary Report on Patentability issued Mar. 20, 2012 in respect of PCT/CA2010/001447.

*Primary Examiner* — Bradley Duckworth
(74) *Attorney, Agent, or Firm* — Bereskin & Parr LLP/S.E.N.C.R.L., s.r.l.

(57) ABSTRACT

A first apparatus for supporting a wheel of a vehicle includes a support structure and a support movably mounted on the support structure. At least one locating member and clamping mechanism are mounted to the support structure and the support. The clamping mechanism engages the locating member so that the support is held in a predetermined position relative to the support structure. A second apparatus for supporting a wheel of a vehicle includes a bearing surface and a support movably mounted on the bearing surface. A first locating member is positioned underneath the bearing surface, and a shaft is mounted to the underside of the support and extends through the bearing surface and the locating member. When an actuator is retracted, the first locating member bears against the bearing surface so that the support is held in a predetermined position relative to the bearing surface.

19 Claims, 12 Drawing Sheets

(56) References Cited

U.S. PATENT DOCUMENTS

| | | | |
|---|---|---|---|
| 4,430,802 A * | 2/1984 | Cole | 33/203.12 |
| 4,447,042 A * | 5/1984 | Masui | 254/90 |
| 4,460,158 A * | 7/1984 | Chiesa et al. | 254/124 |
| 4,567,667 A * | 2/1986 | Minagawa et al. | 33/203.12 |
| 4,924,591 A * | 5/1990 | Brodu | 33/203.14 |
| 5,054,207 A * | 10/1991 | Marshall | 33/600 |
| 5,267,380 A * | 12/1993 | Ronge et al. | 29/33 R |
| 5,287,626 A * | 2/1994 | Reich | 33/1 N |
| 5,355,586 A * | 10/1994 | Fukuda et al. | 33/203.13 |
| 5,522,139 A * | 6/1996 | Rossato | 33/203.12 |
| 5,675,515 A * | 10/1997 | January | 700/279 |
| 5,855,359 A * | 1/1999 | Chipperfield | 254/88 |
| 6,047,594 A * | 4/2000 | Kroll et al. | 73/122 |
| 6,317,992 B1 * | 11/2001 | Lin | 33/203.14 |
| 6,516,478 B2 * | 2/2003 | Cook et al. | 5/611 |
| 7,143,519 B2 * | 12/2006 | Jackson | 33/203.12 |
| 7,308,971 B2 * | 12/2007 | Liebetreu et al. | 187/216 |
| 7,472,485 B2 * | 1/2009 | Gray et al. | 33/203.14 |
| 8,251,553 B2 * | 8/2012 | Dantas | 362/382 |
| 8,590,852 B2 | 11/2013 | Dantas et al. | |
| 2003/0098206 A1 * | 5/2003 | Gallese | 187/216 |
| 2007/0130784 A1 * | 6/2007 | Gray et al. | 33/203 |
| 2011/0062303 A1 | 3/2011 | Dantas et al. | |

* cited by examiner

APPARATUS FOR SUPPORTING A WHEEL OF A VEHICLE

This application is a continuation of U.S. application Ser. No. 12/881,699, filed Sep. 14, 2010, which claims the benefit of U.S. Provisional Application No. 61/242,248, filed Sep. 14, 2009, and the entire contents of which are hereby incorporated by reference.

FIELD

This specification relates to vehicle wheel alignment systems.

BACKGROUND

The following paragraphs are not an admission that anything discussed in them is prior art or part of the knowledge of persons skilled in the art.

U.S. Pat. No. 7,143,519 to Jackson discloses an alignment measurement system for a vehicle that includes an alignment sensing system and a suspension relaxing system. The suspension relaxing system is configured to receive at least one wheel of the vehicle and is operable between a plurality of states. The alignment sensing system is operatively connected to the suspension relaxing system to select a state of the suspension relaxing system. In a first state, the suspension relaxing system maintains the wheel of the vehicle stationary when the wheel is received by the suspension relaxing system, and in a second state, the suspension relaxing system allows the wheel to turn and/or translate. Prior to performing a measurement on the alignment of the vehicle, the alignment sensing system directs the suspension relaxing system to be operated in the second state.

U.S. Pat. No. 7,308,971 to Liebetreu et al. discloses a vehicle support system runway with a movable surface for supporting the wheels of a vehicle in such a manner as to permit a limited range of translational motion about a centered position, having an automatic centering and locking system. The centering and locking system is configured to releasably secure the movable surface in a locked configuration at a centered position, in response to a remote command.

U.S. Pat. No. 7,472,485 to Gray et al. discloses a wheel alignment turntable for supporting a wheel of a vehicle. Embodiments include a turntable having a base, and a top plate for receiving the vehicle wheel, the top plate being mounted to an upper surface of the base for rotational and translational movement relative to the base. A pair of paddles, removably adjustably attachable to the base, engages a peripheral wall of the top plate for maintaining the top plate in a predetermined position relative to the base while the vehicle wheel is being positioned on the turntable. The paddles are easily removable when the wheel is supported on the turntable. A plurality of slide pads are removably mounted to a lower surface of the base, for enabling sliding motion between the turntable and a surface of a lift without damaging paint on the surface of the lift. The slide pads are stackable against one another for adjusting height of the turntable relative to the lift.

INTRODUCTION

In an aspect of this specification, an apparatus for supporting a wheel of a vehicle is provided. The apparatus including a support structure, a support for supporting the wheel of the vehicle, the support movably mounted on the support structure, the support having a topside and an underside, at least one locating member mounted to one of the support structure and the underside of the support, and at least one clamping mechanism mounted to the other of the support structure and the underside of the support, the clamping mechanism selectively actuated between first and second positions, in the first position the support is moveable relative to the support structure, in the second position the clamping mechanism engages the locating member so that the support is held in a predetermined position relative to the support structure.

In an aspect of this specification, an apparatus for supporting a wheel of a vehicle is provided. The apparatus including a bearing surface, a support for supporting the wheel of the vehicle, the support movably mounted over the bearing surface, the support having a topside and an underside, a first locating member positioned relative to the bearing surface, and an actuator coupled to at least one of the first locating member, support and the bearing surface, so that when the actuator is in a first position the support is movable relative to the bearing surface, and when the actuator is in a second position the first locating position bears against the bearing surface so that the support is held in a predetermined position relative to the bearing surface.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. In the drawings.

DESCRIPTION OF VARIOUS EMBODIMENTS

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

Motor vehicle alignment systems are used to ensure that the alignment of wheels on a vehicle is within set specifications. If the wheels are out of alignment, there may be excessive or uneven wear of the wheels. In addition, the performance of the vehicle, particularly handling and stability, may be adversely affected if the wheels are not properly aligned.

As used herein, the term "wheel" or "vehicle wheel" refers to the tire and wheel assembly found on a motor vehicle. Such an assembly generally includes a conventional tire that is mounted on a metal wheel or "rim."

Figure 1:
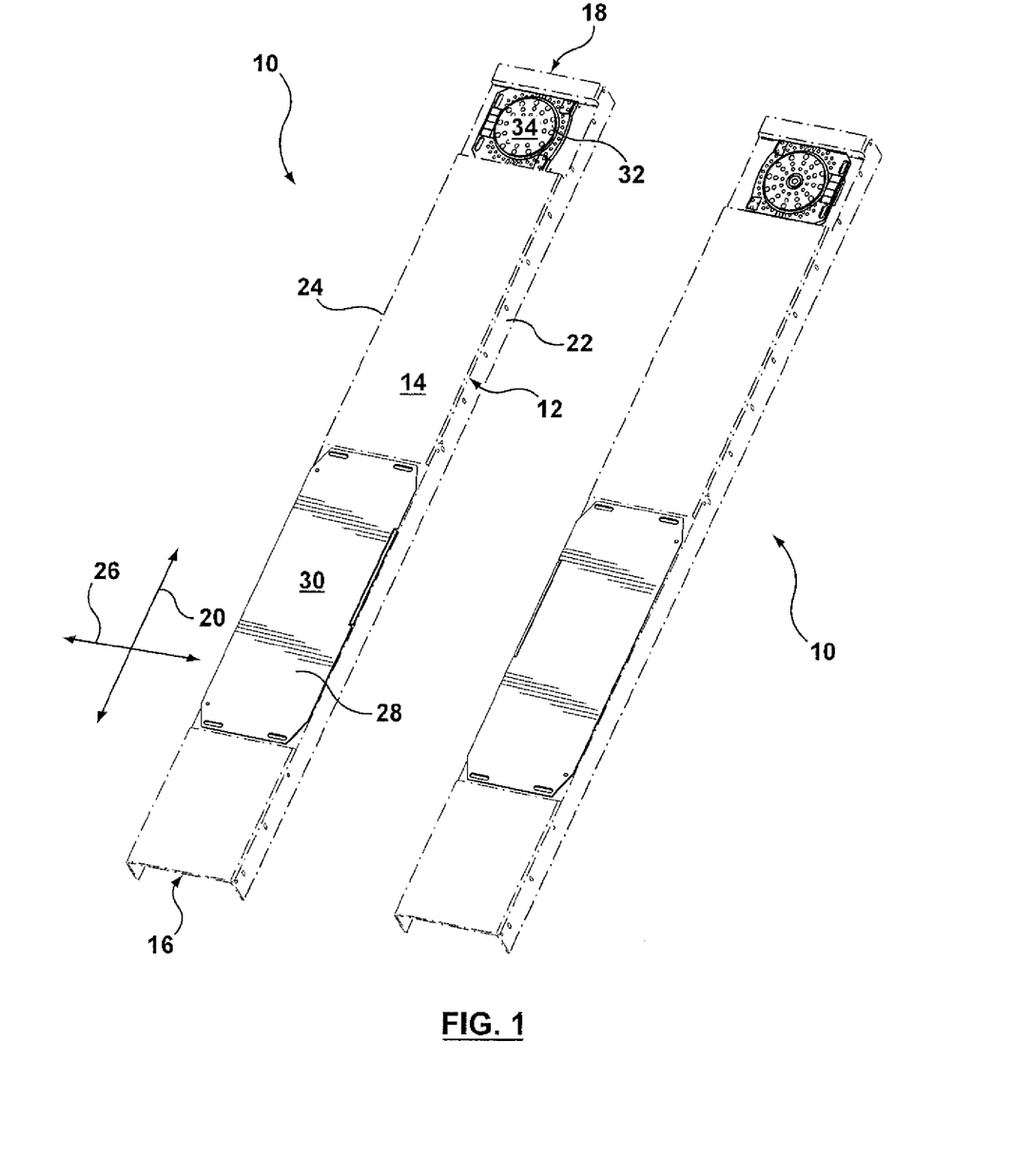
FIG. 1 shows a top perspective view of a pair of wheel runways with moveable supports.

The wheels of a motor vehicle may be aligned in a number of ways. Movable surfaces commonly referred to as turn plates and slip plates are placed on a vehicle support or lift system on which the vehicle undergoing an alignment procedure is parked, for example, but not limited to, on wheel runway apparatuses 10 shown in FIG. 1. Two of the wheel runway apparatuses 10 can be arranged horizontally in an adjacent pair to form a vehicle support or lift system. The wheel runway apparatus 10 can also be utilized in various vehicle support or lift systems, including but not limited to four-post lift systems and scissor lift systems.

The wheel runway apparatus 10 includes a support structure 12. The support structure 12 includes a top surface 14 for supporting wheels of a vehicle. The support structure 12 includes first and second ends 16, 18, and a length extending between the first and second ends 16, 18 defining a longitudinal direction 20. The support structure 12 further includes inner and outer sides 22, 24, and a width extending between the inner and outer sides 22, 24 defining a lateral direction 26.

The wheel runway apparatus 10 can include a first support 28 movably mounted on the support structure 12. The first support 28 can be located towards the first end 16 of the support structure 12. The first support 28 has a topside 30 defining a surface for supporting fixed or rear wheels of a vehicle. The first support 28 can be generally rectangular, and the topside 30 can be generally flush with the top surface 14 of the support structure 12. The first support 28 can permit limited motion of the fixed wheels of the vehicle in a horizontal plane, at least in the lateral direction 26, relative to the support structure 12.

The wheel runway apparatus 10 can also include a second support 32 movably mounted on the support structure 12. The second support 32 can be located towards the second end 18 of the support structure 12. The second support 32 has a topside 34 defining a surface for supporting steered or front wheels of a vehicle. The second support 32 can be generally round, and the topside 34 can be generally flush with the top surface 14 of the support structure 12. The second support 32 can permit rotational motion so that the steered wheels of a vehicle can be steered from side to side, and simultaneously can permit limited motion in a horizontal plane, in the longitudinal and lateral directions 20, 26, relative to the support structure 12.

Prior to driving a vehicle over the vehicle support surface, and at certain times before and during alignment procedures, the supports plates 28, 32 can be held, as described herein, in predetermined positions to prevent movement. Once alignment procedures have been completed, the supports plates 28, 32 can again be held in a stationary configuration before the vehicle is driven off the vehicle lift system.

Figure 2:
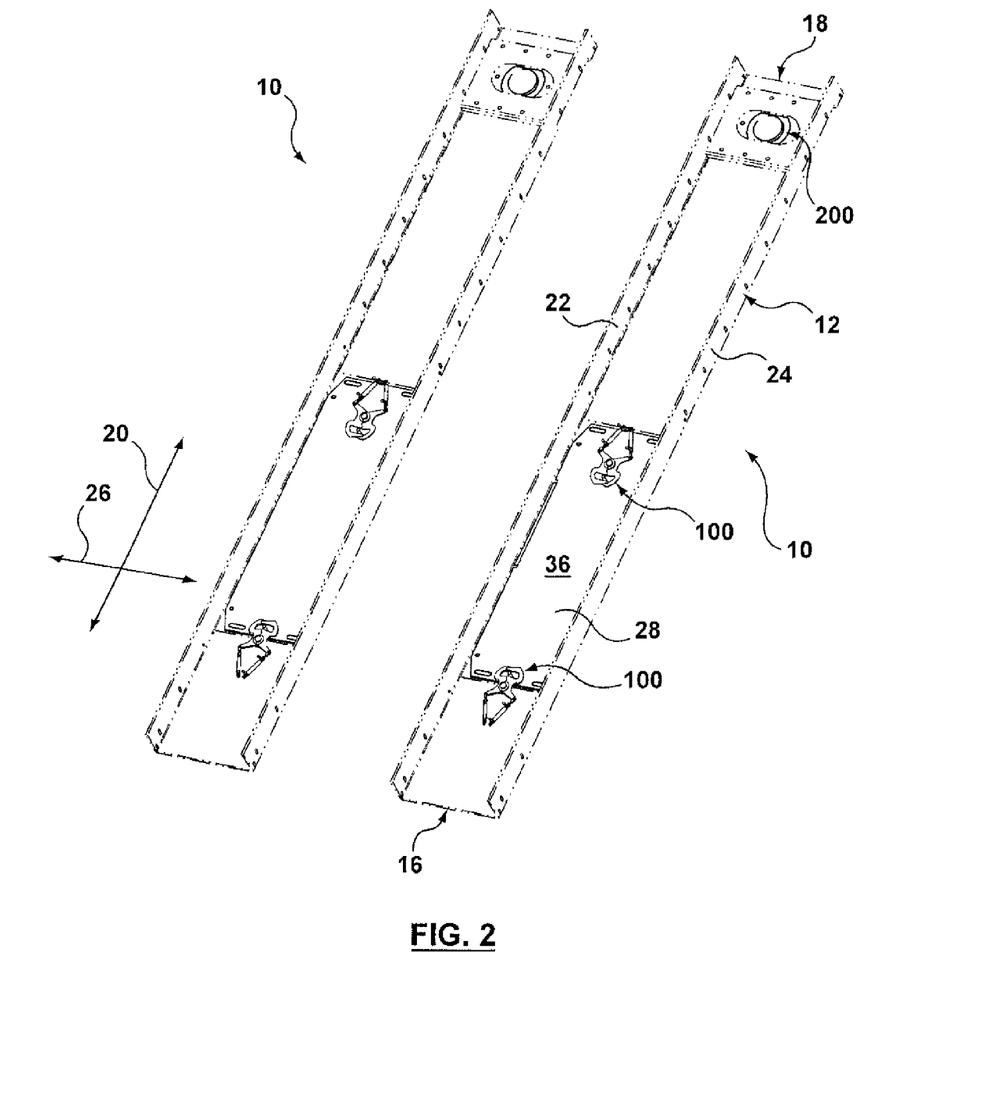
FIG. 2 shows a bottom perspective view of the wheel runways of FIG. 1 including first and second locking mechanisms.

Referring to FIG. 2, the wheel runway apparatus 10 can include at least one locking mechanism 100 associated with the first support 28. The locking mechanism 100 is mounted to either the support structure 12 or the first support 28, for example, but not limited to, an underside 36 of the first support 28, as described in more detail below. The wheel runway apparatus 10 can further include a locking mechanism 200 associated with the second support 32.

Figure 3:
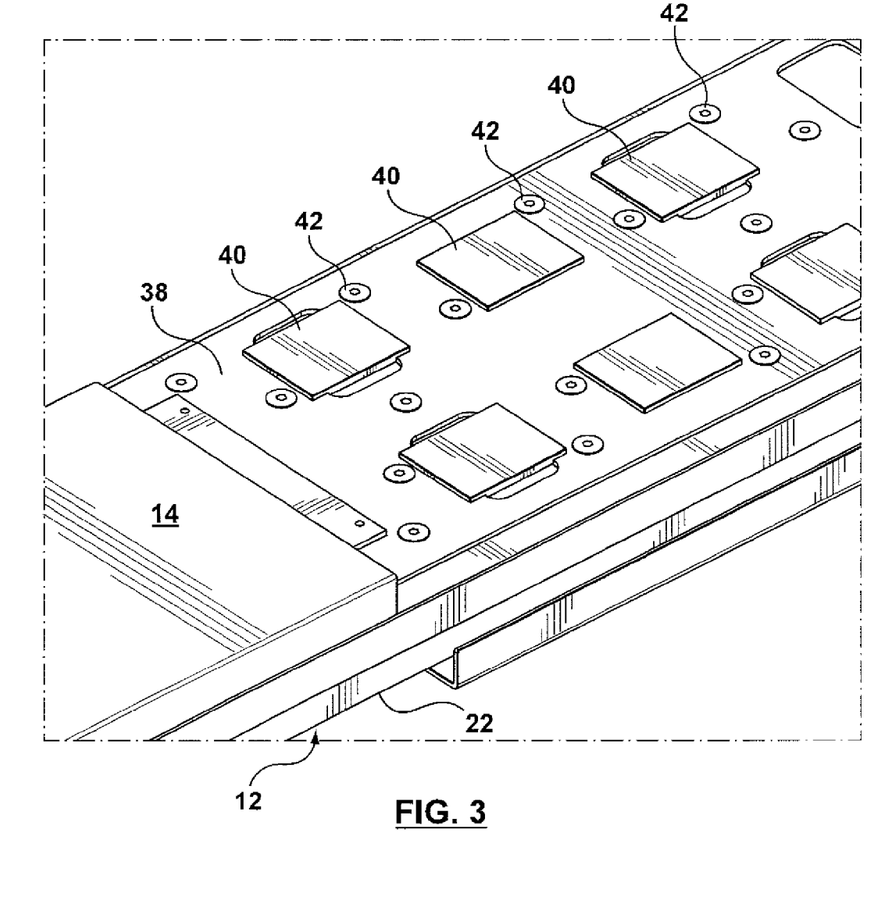
FIG. 3 shows a detailed, top perspective view of a support structure including means for moveably mounting a support.

Referring to FIG. 3, in some examples, an internal portion 38 of the support structure 12 can include a plurality of low-friction sliding pads 40 and a plurality ball transfer units 42. The first support 28 is movably mounted on top of the sliding pads 40 and the ball transfer units 42. However, there are other means by which the first support 28 can be movably mounted to the support structure 12, and applicant does not intend to be limited as such.

Referring to FIGS. 4A, 4B, 5, 6A and 6B, the first locking mechanism 100 includes a clamping mechanism 102 and a locating member 104. The clamping mechanism 102 can be mounted to the support structure 12, and the locating member 104 can be mounted to the first support 28, for example, but not limited to, the underside 36 of the first support 28. The clamping mechanism 102 can be mounted by a bracket 106 fixed to a rib 108 of the support structure 12, and by a pivot member or pin 110 fixed to the internal portion 38 of the support structure 12. The internal portion 38 of the support structure 12 can include a window 39 for receiving the locating member 104 therethrough. The window 39 can be sized and shaped to allow the locating member 104 enough room to move in the lateral and longitudinal directions 20, 26 (see FIG. 1 or 2). The locating member 104 can be fixed to the first support 28, for example, but not limited to, the underside 36 of the first support 28, and the pivot member 110 can be solidly fixed to the internal portion 38, for example, but not limited to, using welding or fasteners. However, in alternative configurations with a reverse arrangement, the clamping mechanism 102 can be mounted to the underside 36 of the first support 28, and the locating member 104 can be mounted to the support structure 12.

Figure 4A:
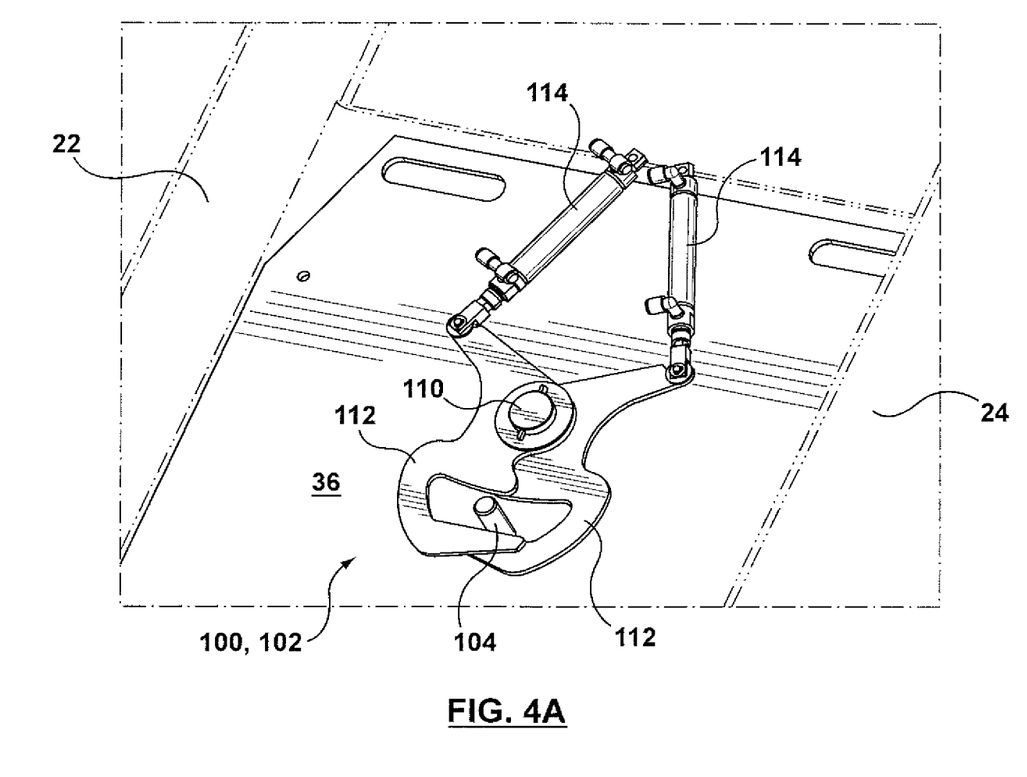
FIGS. 4A and 4B show detailed, bottom perspective views of a clamping mechanism in open and closed positions, respectively.

In some examples, as illustrated, the clamping mechanism 102 can include at least one engagement arm 112. In various embodiments, at least two engagement arms 112 are used, but the invention is not intended to be limited to two engagement arms. Where two engagement arms 112 are utilized, the arms 112 are configured in generally opposed relation to one another, as shown in FIG. 4A. Both of the engagement arms 112 can be pivotally mounted to the pivot member 110.

Figure 4B:
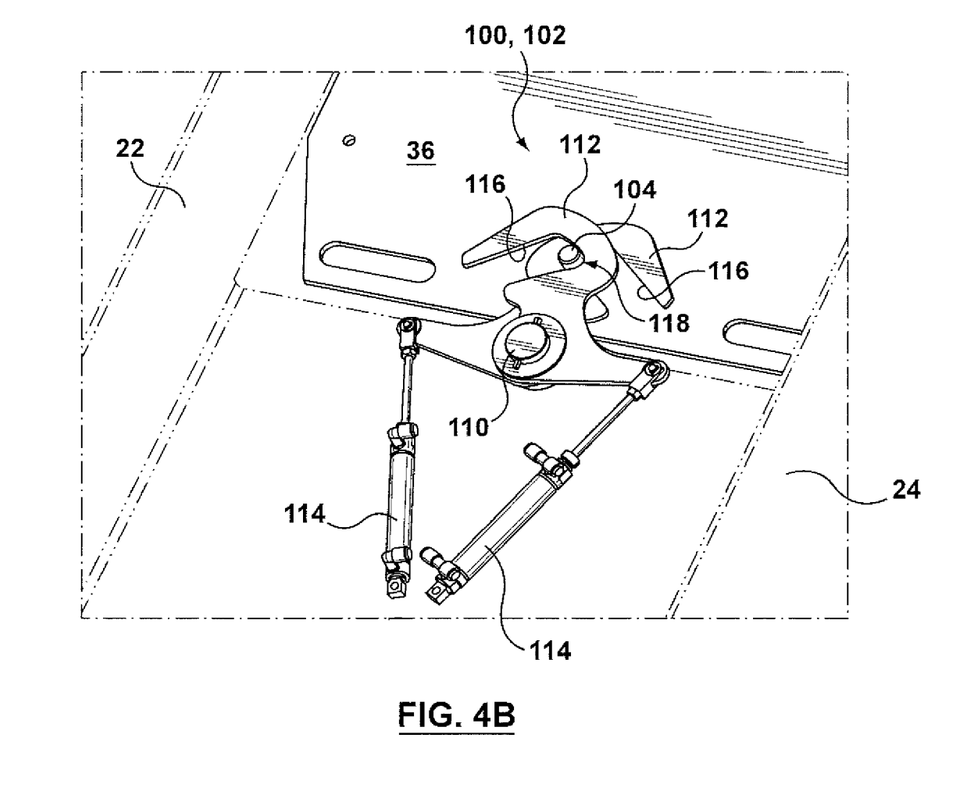

The clamping mechanism 102 can also include at least one actuator 114 coupled to the engagement arms 112. The actuator 114 is configured to move the engagement arms 112 between open and closed positions. For example, but not limited to, the engagement arms can retract to move the engagement arms 112 between closed and open positions and extend to move the engagement arms 112 between open and closed positions. In some examples, the actuator 114 can be a linear pneumatic cylinder. In some particular examples, the actuator 114 can be a SMC™ model no. NCMC075-0300-X155US. Other mechanical or hydraulic actuators could be used.

The actuator 114 can be remotely actuated between the extended and retracted positions. For example, the actuator 114 can be selectively activated through a switch or control provided on the main lift system console (not shown). Alternatively, or additionally, the actuator 114 can be selectively activated through a switch provided on the lift system itself, whether on the support structure 12 or another area that is readily accessible by the mechanic.

The actuator 114 of the clamping mechanism 102 is selectively actuated between an open position (see FIG. 4A) and a closed position (see FIG. 4B), In the open position, the first support 28 is moveable relative to the support structure 12. In the closed position, the engagement arms 112 engage and bear against the locating member 104, thereby moving the first support 28 to a predetermined or generally centered position and holding the first support 28 in the predetermined position relative to the support structure 12. The predetermined position is not necessarily a centered position. The predetermined position can be selected so that the support 28 is offset in the longitudinal or lateral directions 20, 26 from its centered position relative to the support structure 12.

In some embodiments, the engagement arms 112 engage the locating member 104 in a scissor-like action. The size and shape of the engagement arms 112 can be varied depending on the output force of the actuator 114. For example, the length of portion 113 (see FIG. 5) between the pivot member 110 and the actuator 114 can be extended to multiply, by mechanical advantage, the engaging force applied to the locating member 104 when in the closed position.

In the closed position, if an excessive load is applied to the first support 28, for example, generally in the lateral direction 20, the actuator 114 may at least partially absorb the load allowing the engagement arms 112 and thus the first support 28 to move out of the predetermined position, generally in the direction of the applied force. Once the excessive load ceases, the actuator 114 can urge the first support 28 back to the predetermined position.

Figure 5:
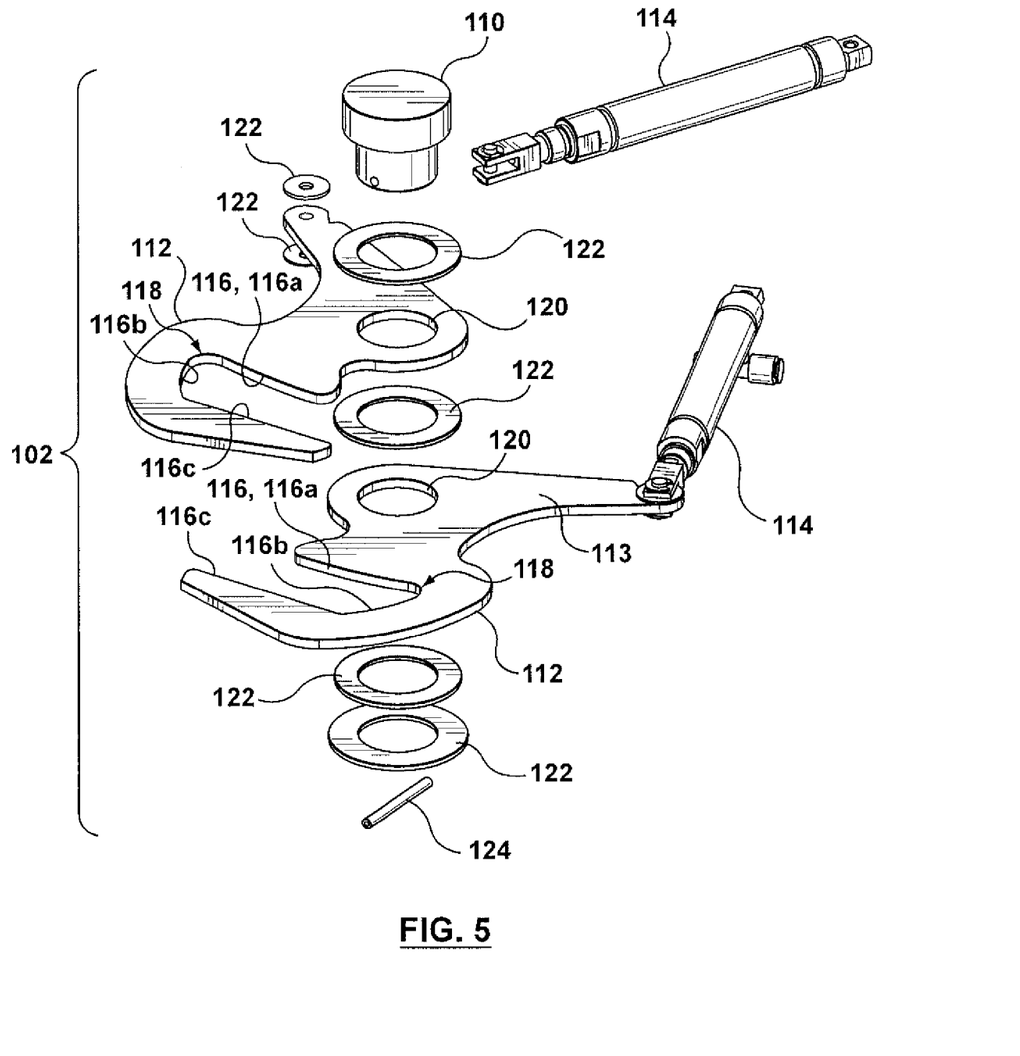
FIG. 5 shows an exploded perspective view of the clamping mechanism of FIGS. 4A and 4B.
Figure 6A:
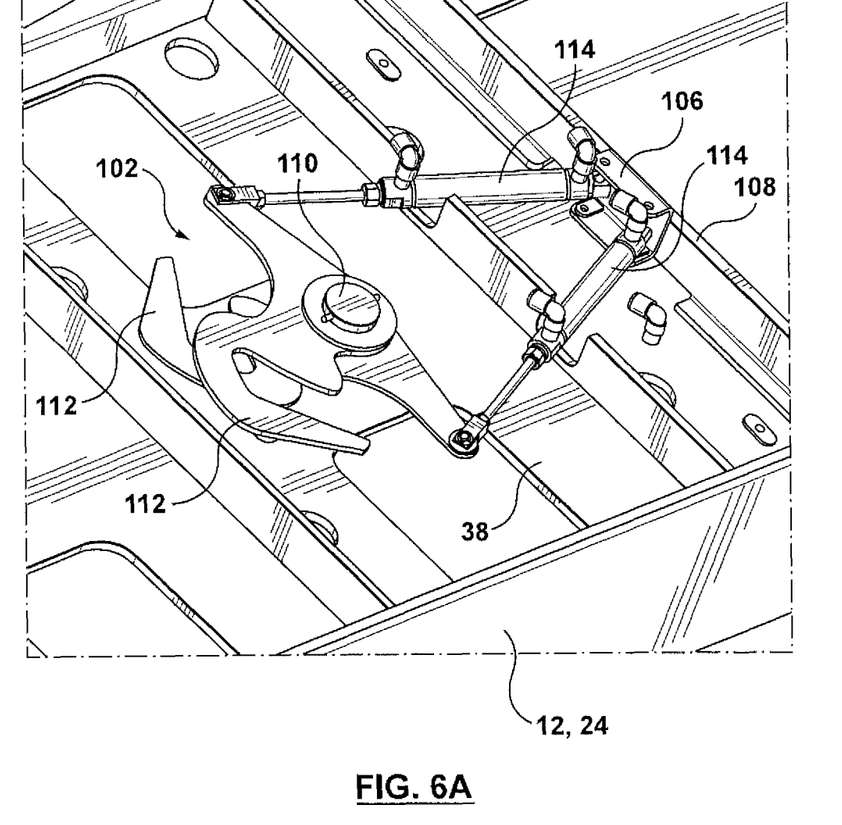
FIGS. 6A and 6B show detailed, bottom perspective views of a support structure with and without the clamping mechanism mounted thereon, respectively.
Figure 6B:
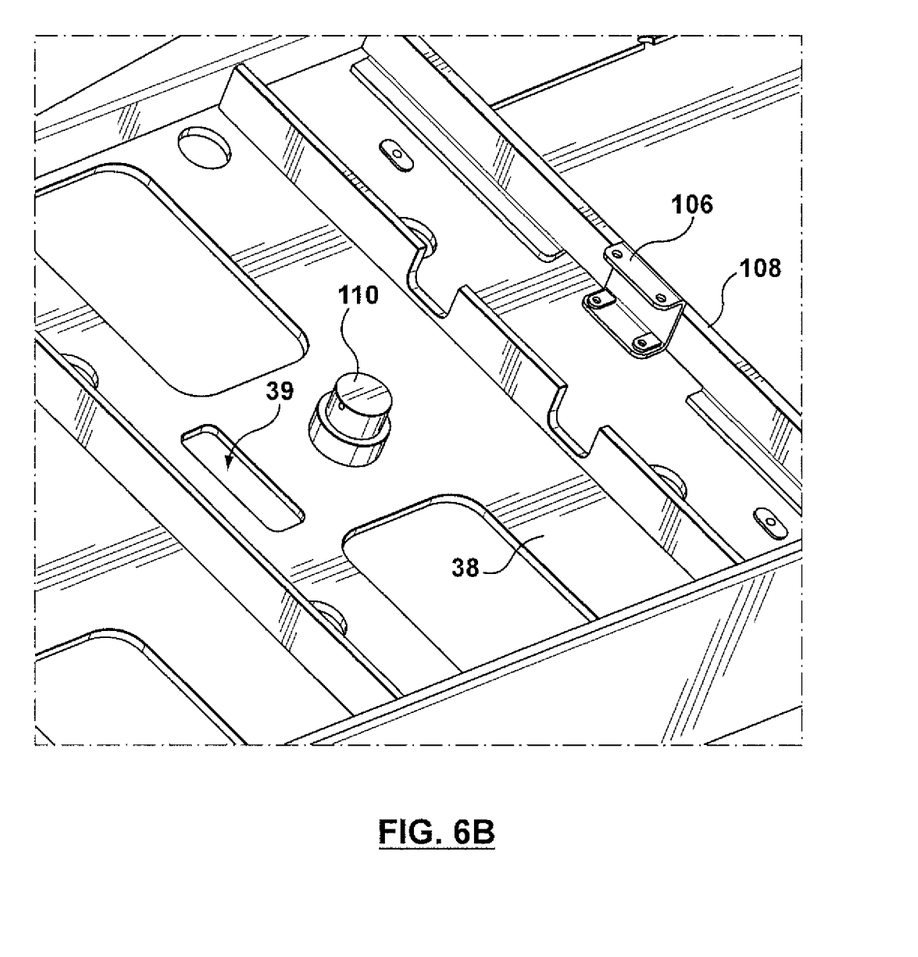
Figure 7:
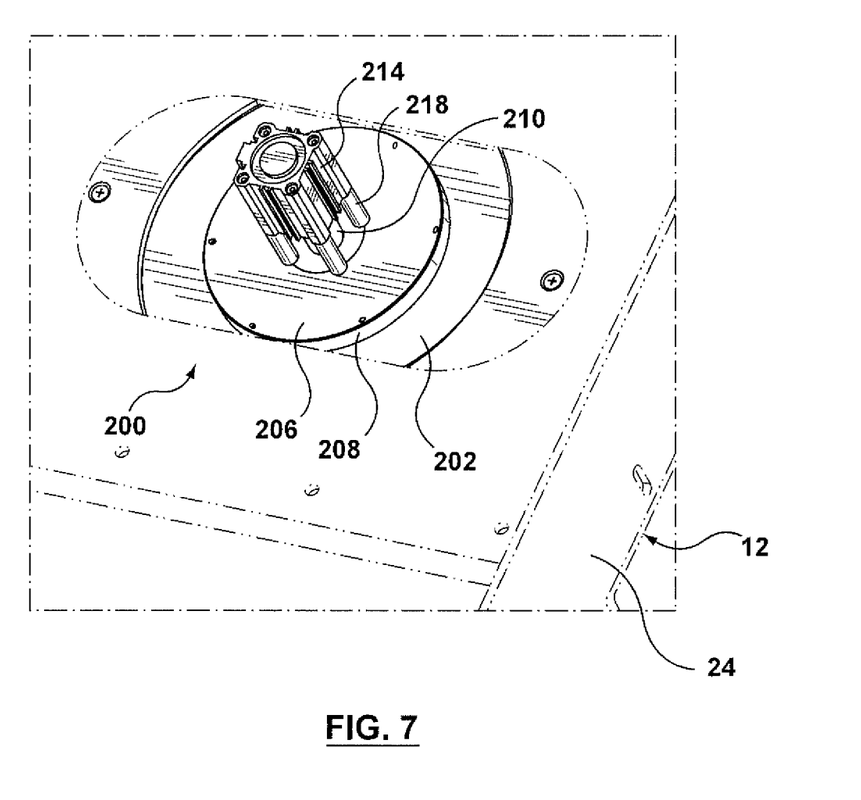
FIG. 7 shows a detailed, bottom perspective view of a second locking mechanism.
Figure 8:
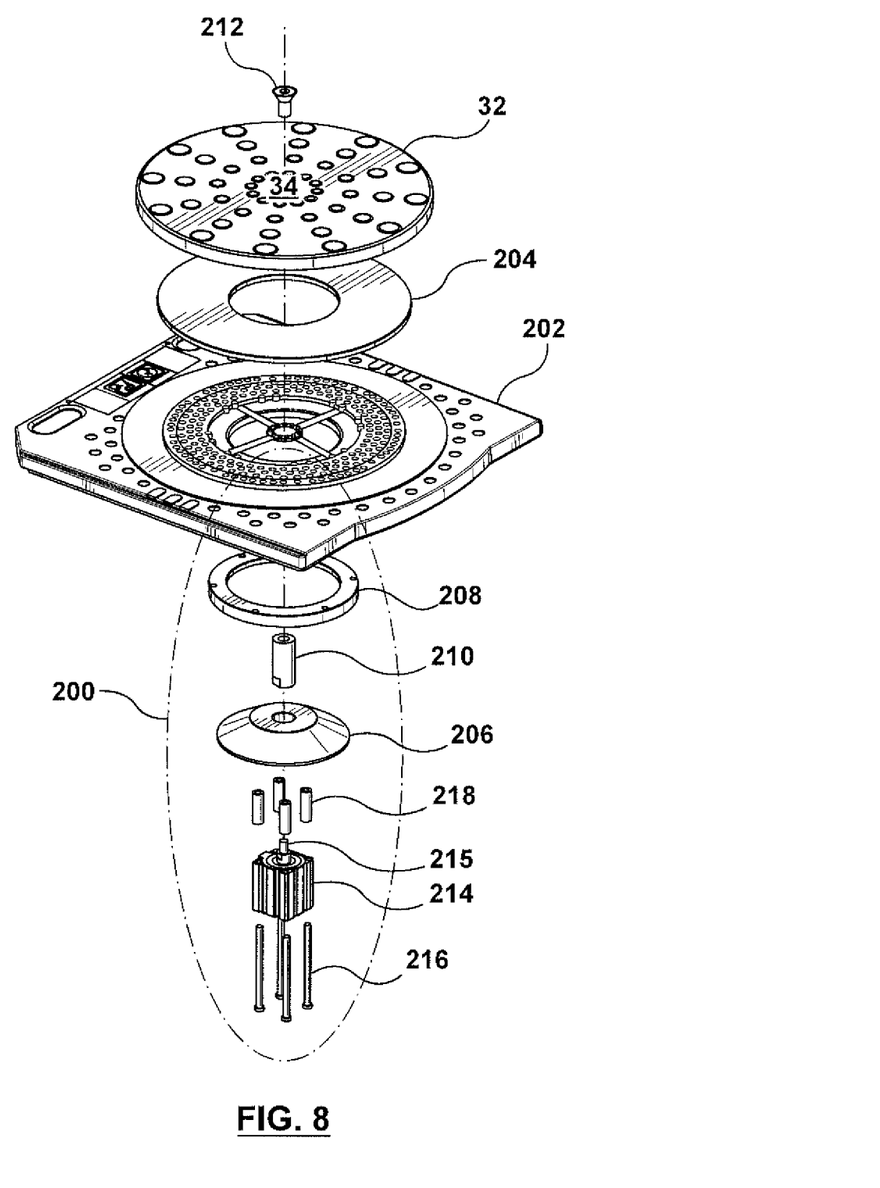
FIG. 8 shows an exploded perspective view of the second locking mechanism.

Referring particularly to FIG. 5, each of the engagement arms 112 can include a non-linear guiding surface 116 for engaging the locating member 104. The guiding surface 116 can include a first portion 116a, a second portion 116b that is non-parallel relative to first portion 116a, and a third portion 116c that is non-parallel relative to the second portion 116b. The first and second portions 116b, 116c of the guiding surface 116 can form a corner portion 118. Referring to FIG. 4B, in the closed position, each of the engagement arms 112 can retain the locating member 104 in the corner portion 118 of the guiding surfaces 116.

The engagement arms 112 can each include an aperture 120 sized and shaped to receive the pivot member 110. The clamping mechanism 102 can further include a plurality of washers 122 of various shapes and sizes used to minimize wear and actuation forces between components. The clamping mechanism 102 can further include a pin 124 used in association with the pivot member 110 to retain the assembly of components together on the pivot member 110.

Referring to FIGS. 7, 8, 9A and 9B, the second locking mechanism 200 can include a base 202. The base 202 can be mounted on or to the support structure 12. The second support 32 can be movably mounted on the base 202. For example, a bearing assembly 204 can be disposed between the second support 32 and the base 202.

The second locking mechanism 200 can further include a first locating member 206 positioned, for example, but not limited to, generally underneath the base 202. A second locating member 208 can also be mounted, for example, but not limited to, underneath the base 202, and can be positioned generally between the first locating member 206 and the base 202.

A shaft 210 can be mounted to, for example, but not limited to, an underside 33 of the second support 32. In some examples, the shaft 210 can include threads for receiving a fastener 212. The shaft 210 extends through the base 202 and the locating members 206, 208. The shaft 210 is assembled to an end 215 of at least one actuator 214. The actuator 214 is mounted and fixed spaced apart from the first locating member 206. For example, the actuator 214 can be mounted to the first locating member 206 using fasteners 216 and spacers 218. In some examples, the actuator 214 can be a linear pneumatic cylinder. In some particular examples, the actuator 214 can be a SMC™ model no. NCQ2B40-35DM. Other mechanical or hydraulic actuators could be used.

The actuator 214 can be remotely actuated between the extended and retracted positions. For example, the actuator 214 can be selectively activated through a switch or control provided on the main lift system console (not shown). Alternatively or additionally, the actuator 214 can be selectively activated through a switch provided on the lift system itself, whether on the support structure 12 or another area that is readily accessible by the mechanic.

Figure 9A:
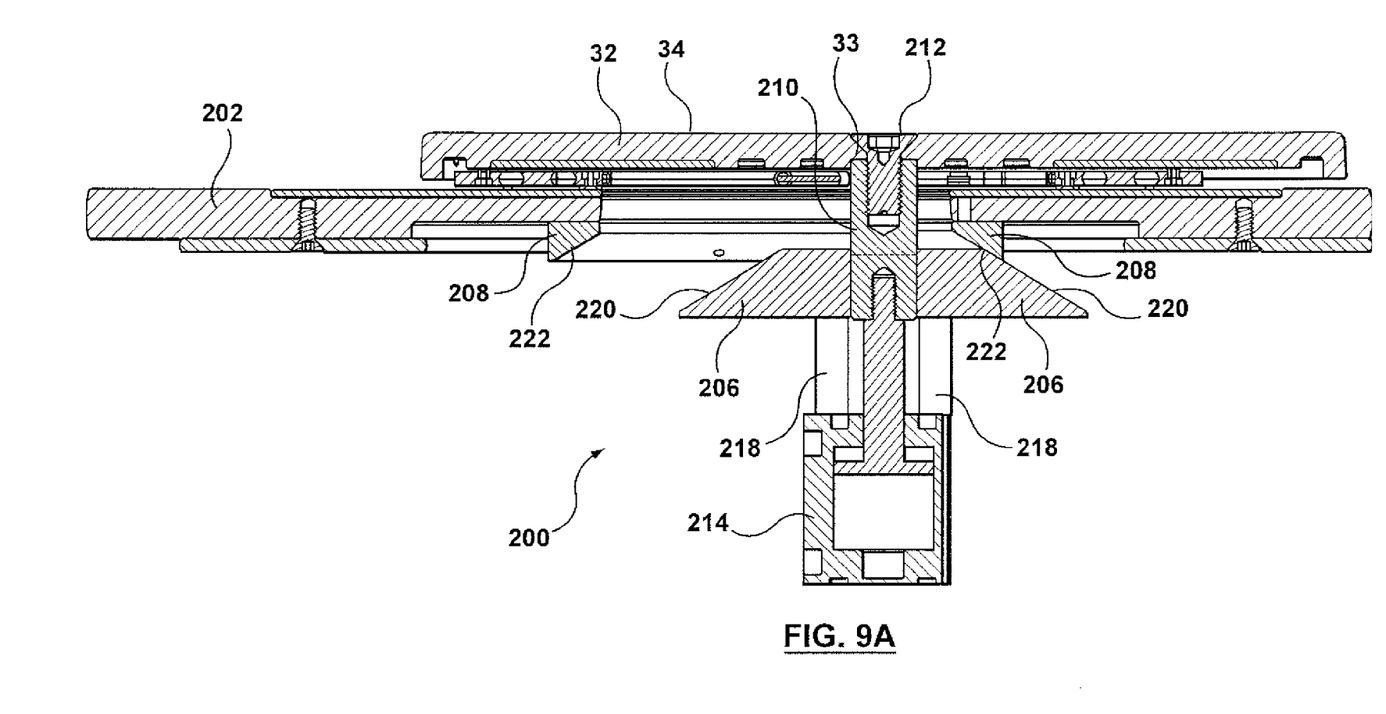
FIGS. 9A and 9B show sectional views of the second locking mechanism with an actuator in extended and retracted positions, respectively.
Figure 9B:
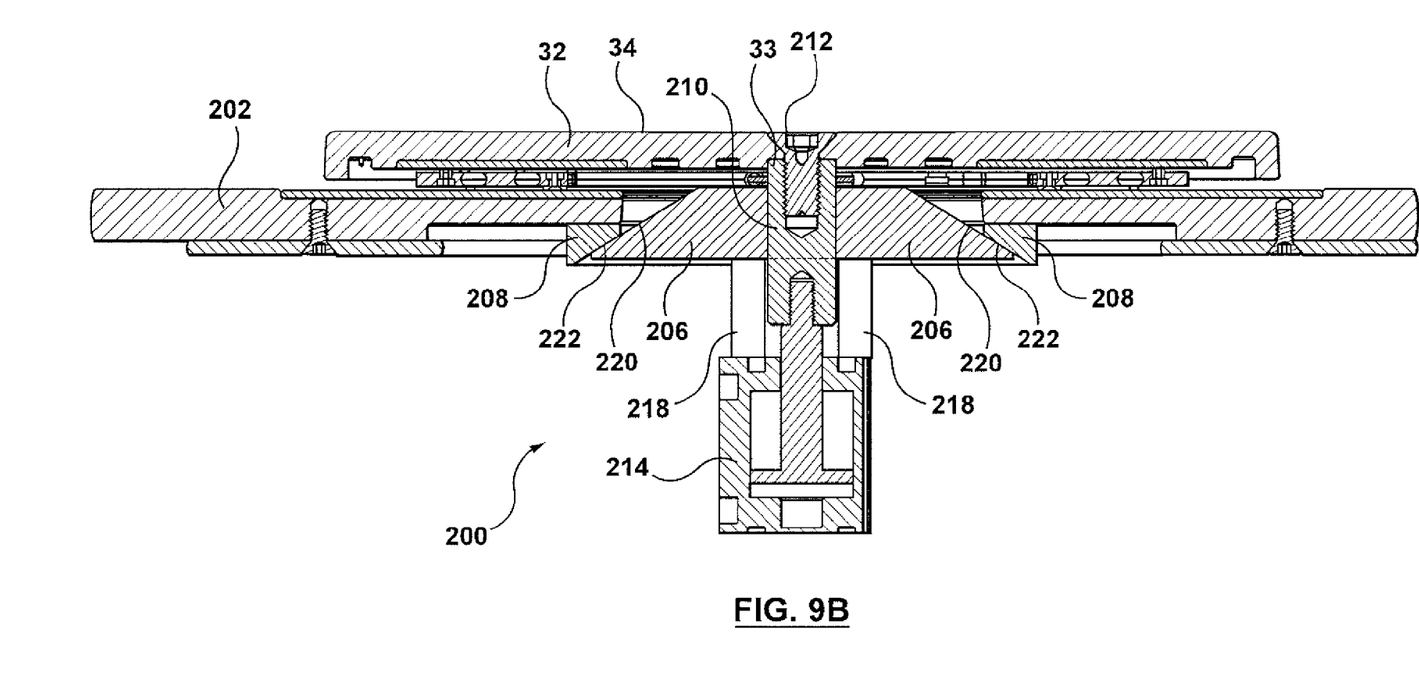

Referring to FIGS. 9A and 9B, the first locating member 206 includes an upper surface 220. The second locating member 208 include a lower or bearing surface 222. The upper and lower surfaces 220, 222 are configured for complementary engagement. In some examples, each of the first and second locating members 206, 208 can be generally annular in shape, and the upper and lower surfaces 220, 222 can be generally frustoconical in shape. However, other shapes and configurations are possible for the first and second locating members 206, 208 and the upper and lower surfaces 220, 222.

The actuator 214 is coupled to the base 202 and is coupled to the second support 32 via the shaft 210. The actuator 214 is selectively moveable between an extended position (see FIG. 9A) and a retracted position (see FIG. 9B). In the extended position, the second support 32 is moveable relative to the base 202, generally in the longitudinal and lateral directions 20, 26 (see FIG. 1), and also rotationally. In the retracted position, the first locating member 206 bears against the second locating member 208 and the base 202 so that the support 32 is held in a predetermined or generally centered position relative to the base 202. In the retracted position, the first locating member 206 is seated with the second locating member 208 and the base 202 so that the support 32 is held in the predetermined position relative to the base 202.

In the retracted position, if an excessive load is applied to the second support 32, for example, generally in the lateral direction 20 (see FIG. 1 or 2), the actuator 214 may at least partially absorb the load allowing the second plate 32 to move out of the predetermined position, generally in the direction of the applied force. Once the excessive load ceases, the actuator 214 can urge the second support 32 back to the predetermined position.

A vehicle wheel alignment system can include, for example, but not limited to, two of the wheel runway apparatuses 10 arranged horizontally in an adjacent pair. Each of the runway apparatuses can include, in combination, the first support 28 with the locking mechanism 100 for supporting fixed wheels of a vehicle, and the second support 32 and the locking mechanism 200 for supporting steered wheels of the vehicle. Other configurations are possible, for example, the first locking mechanism 100 can be generally implemented with the second support 32, or the second locking mechanism 200 can be generally implemented with the first support 28.

While the above description provides examples of one or more processes or apparatuses, it will be appreciated that other processes or apparatuses may be within the scope of the accompanying claims.

We claim:

1. An apparatus for supporting a wheel of a vehicle, comprising:
   a) a base;
   b) a support movably mounted over the base, the support comprising a topside for supporting the wheel of the vehicle and an underside;
   c) a first locating member positioned underneath the base; and
   d) an actuator coupled to the support and configured to move the first locating member relative to the base so that when the actuator is in a first position the support is movable relative to the base, and when the actuator is in a second position the first locating member bears upwardly against the base thereby holding the support in a predetermined position relative to the base.

2. The apparatus of claim 1, wherein, in the second position, the first locating member is seated with the base so that the support is held in the predetermined position relative to the base.

3. The apparatus of claim 1, further comprising a second locating member mounted underneath the base, and, in the second position, the first locating member is seated with the second locating member so that the support is held in the predetermined position relative to the base.

4. The apparatus of claim 3, wherein the first locating member comprises an upper surface and the second locating member comprises a lower surface, and the upper and lower surfaces are configured for complementary engagement.

5. The apparatus of claim 4, wherein each of the first and second locating members is generally annular in shape.

6. The apparatus of claim 4, wherein the upper and lower surfaces are generally frustoconical in shape.

7. An apparatus for supporting a wheel of a vehicle, comprising:
   a base;
   a support for supporting the wheel of the vehicle, the support movably mounted to the base;
   a first locating member positioned underneath the base; and
   an actuator coupled to the support and configured to selectively move the first locating member upwardly to bear against the base so that the support is held in a predetermined position relative to the base.

8. The apparatus of claim 7, further comprising a second locating member mounted underneath the base, and the first locating member is seated with the second locating member to hold the support in the predetermined position relative to the base.

9. The apparatus of claim 8, wherein the first locating member comprises an upper surface, and the second locating member comprises a lower surface for complementary engagement with the upper surface of the first locating member.

10. The apparatus of claim 9, wherein each of the first and second locating members is generally annular in shape, and the upper and lower surfaces are generally frustoconical in shape.

11. The apparatus of claim 10, further comprising a shaft mounted to an underside of the support, the shaft extending downwardly through the base and the first and second locating members, and the actuator is assembled with a lower end of the shaft.

12. The apparatus of claim 11, wherein the actuator comprises a linear cylinder unit having a cylinder rod arranged generally vertically in a cylinder housing, and the lower end of the shaft is assembled with an upper end of the cylinder rod, and the first locating member is assembled with the cylinder housing.

13. The apparatus of claim 12, wherein the actuator selectively moves between a first position in which the cylinder rod is at least partially extended upwardly relative to the cylinder housing, and a second position in which the cylinder rod is at least partially retracted into the cylinder housing.

14. An apparatus for supporting a wheel of a vehicle, comprising:
   a) a base;
   b) a support plate movably mounted to the base, the support plate comprising a topside for supporting the wheel of the vehicle, and an underside;
   c) a shaft mounted to the underside of the support plate;
   d) a first locating member positioned underneath the base, the first locating member comprising an upper surface;
   e) a second locating member mounted underneath the base, the second locating member comprising a lower surface for complementary engagement with the upper surface of the first locating member; and
   f) an actuator assembled with the shaft and the first locating member,
   wherein the actuator selectively moves between first and second positions,
   wherein, in the first position, the support plate is moveable relative to the base, and
   wherein, in the second position, the first locating member is urged upwardly so that the upper surface of the first locating member is seated with the lower surface of the second locating member thereby holding the support plate in a predetermined position relative to the base.

15. The apparatus of claim 14, wherein each of the first and second locating members is generally annular in shape.

16. The apparatus of claim 15, wherein the upper and lower surfaces are generally frustoconical in shape.

17. The apparatus of claim 15, wherein the shaft extends downwardly through the base and the first and second locating members, and the actuator is assembled with a lower end of the shaft.

18. The apparatus of claim 17, wherein the actuator comprises a linear cylinder unit having a cylinder rod arranged generally vertically in a cylinder housing, and the lower end of the shaft is assembled with an upper end of the cylinder rod, and the first locating member is assembled with the cylinder housing.

19. The apparatus of claim 18, wherein, in the first position, the cylinder rod is at least partially extended upwardly relative to the cylinder housing, and, in the second position, the cylinder rod is at least partially retracted into the cylinder housing.

* * * * *